US007013064B2

(12) United States Patent
Wang

(10) Patent No.: US 7,013,064 B2
(45) Date of Patent: Mar. 14, 2006

(54) FREESPACE TUNABLE OPTOELECTRONIC DEVICE AND METHOD

(75) Inventor: Jian Wang, Orefield, PA (US)

(73) Assignee: NanoOpto Corporation, Somerset, NJ (US)

( * ) Notice: Subject to any disclaimer, the term of this patent is extended or adjusted under 35 U.S.C. 154(b) by 102 days.

(21) Appl. No.: 10/463,478

(22) Filed: Jun. 17, 2003

(65) Prior Publication Data

US 2004/0071180 A1 Apr. 15, 2004

Related U.S. Application Data

(60) Provisional application No. 60/417,226, filed on Oct. 9, 2002.

(51) Int. Cl.
*G02B 6/34* (2006.01)
*H01S 3/08* (2006.01)

(52) U.S. Cl. .......................... 385/37; 385/15; 372/102

(58) Field of Classification Search ................. 385/15, 385/37; 372/102
See application file for complete search history.

(56) References Cited

U.S. PATENT DOCUMENTS

| | | | |
|---|---|---|---|
| 4,615,034 A | 9/1986 | Von Gunten et al. | |
| 4,638,669 A | 1/1987 | Chou | |
| 4,650,289 A | 3/1987 | Kuwahara | |
| 4,732,444 A | 3/1988 | Papuchon et al. | |
| 4,763,972 A | 8/1988 | Papuchon et al. | |
| 4,778,234 A | 10/1988 | Papuchon et al. | |
| 4,998,793 A | 3/1991 | Henry et al. | |
| 5,077,816 A | 12/1991 | Glomb et al. | |
| 5,088,105 A | 2/1992 | Scifres et al. | |
| 5,091,981 A | 2/1992 | Cunningham | |
| 5,283,845 A | 2/1994 | Ip | |
| 5,299,212 A | 3/1994 | Koch et al. | |
| 5,461,246 A | 10/1995 | Chou | |
| 5,467,415 A | 11/1995 | Presby | |
| RE35,337 E | 9/1996 | Patel et al. | |
| 5,598,300 A * | 1/1997 | Magnusson et al. | 359/566 |
| 5,617,234 A | 4/1997 | Koga et al. | |
| 5,654,818 A | 8/1997 | Yao | |
| 5,691,989 A | 11/1997 | Rakuljic et al. | |
| 5,706,301 A | 1/1998 | Lagerstrom | |
| 5,719,976 A | 2/1998 | Henry et al. | |
| 5,726,805 A | 3/1998 | Kaushik et al. | |
| 5,772,905 A | 6/1998 | Chou | |
| 5,777,793 A | 7/1998 | Little et al. | |
| 5,793,784 A | 8/1998 | Wagshul et al. | |
| 5,820,769 A | 10/1998 | Chou | |
| 5,848,080 A | 12/1998 | Dahm | |
| 5,852,688 A | 12/1998 | Brinkman et al. | |
| 5,870,421 A | 2/1999 | Dahm | |
| 5,956,216 A | 9/1999 | Chou | |

(Continued)

OTHER PUBLICATIONS

Austin, M., et al., "Fabrication for nanocontacts for molecular devices using nanoimprint lithography," J. Vac. Sci. Technol. B 20(2), Mar./Apr. 2002, pp. 665-667.

(Continued)

*Primary Examiner*—Michelle Connelly-Cushwa
(74) *Attorney, Agent, or Firm*—Reed Smith LLP

(57) ABSTRACT

A tunable optoelectronic device comprising: a resonant grating filter exhibiting at least one filtering characteristic as electromagnetic radiation impinges thereupon; at least one dielectric material coupling said radiation onto said resonant grating filter and movably positioned with respect to said filter so as to adjust the at least one filtering characteristic of said filter; and, at least one driving circuit for selectively positioning said at least one dielectric material so as to tune said at least one filtering characteristic.

13 Claims, 10 Drawing Sheets

U.S. PATENT DOCUMENTS

| | | | |
|---|---|---|---|
| 5,966,483 | A | 10/1999 | Chowdhury |
| 5,973,316 | A | 10/1999 | Ebbesen et al. |
| 5,973,784 | A | 10/1999 | Szwaykowski et al. |
| 6,035,089 | A | 3/2000 | Grann et al. |
| 6,037,644 | A | 3/2000 | Daghighian et al. |
| 6,040,936 | A | 3/2000 | Kim et al. |
| 6,052,238 | A | 4/2000 | Ebbesen et al. |
| 6,064,506 | A | 5/2000 | Koors |
| 6,069,380 | A | 5/2000 | Chou et al. |
| 6,075,915 | A | 6/2000 | Koops et al. |
| 6,101,300 | A | 8/2000 | Fan et al. |
| 6,122,103 | A | 9/2000 | Perkins et al. |
| 6,122,301 | A | 9/2000 | Tei et al. |
| 6,125,220 | A | 9/2000 | Copner et al. |
| 6,130,969 | A | 10/2000 | Villeneuve et al. |
| 6,137,939 | A | 10/2000 | Henry et al. |
| 6,154,318 | A | 11/2000 | Austin et al. |
| 6,154,479 | A | 11/2000 | Yoshikawa et al. |
| 6,169,825 | B1 | 1/2001 | Morey et al. |
| 6,175,667 | B1 | 1/2001 | Wang et al. |
| 6,191,890 | B1 | 2/2001 | Baets et al. |
| 6,198,557 | B1 | 3/2001 | Dultz et al. |
| 6,198,860 | B1 | 3/2001 | Johnson et al. |
| 6,208,463 | B1 | 3/2001 | Hansen et al. |
| 6,215,928 | B1 | 4/2001 | Friesem et al. |
| 6,233,375 | B1 | 5/2001 | Lang et al. |
| 6,233,380 | B1 | 5/2001 | Ferrieu |
| 6,235,141 | B1 | 5/2001 | Feldman et al. |
| 6,240,109 | B1 | 5/2001 | Shieh |
| 6,251,297 | B1 | 6/2001 | Komuro et al. |
| 6,252,709 | B1 | 6/2001 | Sato |
| 6,253,009 | B1 | 6/2001 | Lestra et al. |
| 6,260,388 | B1 | 7/2001 | Borrelli et al. |
| 6,262,002 | B1 | 7/2001 | Carey |
| 6,263,002 | B1 | 7/2001 | Hsu et al. |
| 6,275,291 | B1 | 8/2001 | Abraham et al. |
| 6,285,810 | B1 | 9/2001 | Fincato et al. |
| 6,288,840 | B1 | 9/2001 | Perkins et al. |
| 6,309,580 | B1 | 10/2001 | Chou |
| 6,317,554 | B1 | 11/2001 | Kosaka et al. |
| 6,324,192 | B1 | 11/2001 | Tayebati |
| 6,339,603 | B1 | 1/2002 | Flanders et al. |
| 6,349,103 | B1 | 2/2002 | Chung et al. |
| 6,353,623 | B1 | 3/2002 | Munks et al. |
| 6,359,915 | B1 | 3/2002 | Koch et al. |
| 6,370,177 | B1 | 4/2002 | Genei et al. |
| 6,371,662 | B1 | 4/2002 | Leard et al. |
| 6,374,016 | B1 | 4/2002 | Albert et al. |
| 6,400,860 | B1 | 6/2002 | Chandrasekhar et al. |
| 6,410,416 | B1 | 6/2002 | Dodabalapur et al. |
| 6,482,742 | B1 | 11/2002 | Chou |
| 6,518,189 | B1 | 2/2003 | Chou |
| 6,618,104 | B1 | 9/2003 | Date et al. |
| 6,661,830 | B1 * | 12/2003 | Reed et al. .................. 372/99 |
| 6,661,952 | B1 | 12/2003 | Simpson et al. |
| 6,692,797 | B1 | 2/2004 | Owen et al. |
| 6,713,238 | B1 | 3/2004 | Chou et al. |
| 2004/0130728 | A1 * | 7/2004 | Degertekin et al. ......... 356/505 |

OTHER PUBLICATIONS

Austin, M., et al., "Fabrication of 70 nm channel length polymer organic thin-film transistors using nanoimprint lithography," Appl. Phys. Lett. 81 (23), Dec. 2, 2002, pp. 4431-4433.

Bird, G.R. et al., "The Wire Grid as a Near-Infrared Polarizer," J. of the Optical Soc. of America, 50 (9), 886-890, (1960).

Born, Max, and Wolf, Emil: Principles of Optics: Electromagnetic Theory of Propagation, Interference and Diffraction of Light 7th ed. Oct. 1, 1999, Cambridge University Press, p. 790.

Brundrett, D. L.., et al., "Normal-incidence guided-mode resonant grating filters: design and experimental demonstration" Optics Lett., May 1, 1998;23(9):700-702.

Cao, H., et al., "Gradient Nanostructures for interfacing microfluidics and nanofluidics," Appl. Phys. Lett. 81(16), Oct. 14, 2002, pp. 3058-3060.

Chang, Allan S. P., et al. "A new two-dimensional subwavelength resonant grating filter fabricated by nanoimprint lithography" Department of Electrical Engineering, NanoStructures Laboratory, Princeton University.

Chigrin, D. N.,et al., "Observation of total omnidirectional reflection from a one-dimensional dielectric lattice" Appl. Phy. A. 1999;68:25-28.

Chou, S. Y., et al., "Subwavelength transmission gratings and their applications in VCSELs" Proc. SPIE. 1997;3290: 73-81.

Chou, S. Y., et al., "Observation of Electron Velocity Overshoot in Sub-100-nm-channel MOSFET's in Silicon," IEEE Electron Device Letters, vol. EDL-6, No. 12, Dec. 1985, pp. 665-667.

Chou, S.Y., et al., "Imprint Lithography with 25-Nanometer Resolution" Apr. 5, 1996;272(5258):85-87.

Chou, S.Y. ,et al., "Sub-10 nm imprint lithography and applications" J. Vac. Sci. Technol. B. 1997 Nov.Dec.;15(6): 2897-2904.

Chou, S., et al., "Imprint of sub-25 nm vias and trenches in polymers," Appl. Phys., Lett. 67 (21), Nov. 20, 1995, pp. 3114-3116.

Chou, S., et al., "Lateral Resonant Tunneling Transistors Employing Field-Induced Quantum Wells and Barriers," Proceedings of the IEEE, vol. 79, No. 8, Aug. 1991, pp. 1131-1139.

Chou, S., et al., "Nanoscale Tera-Hertz Metal-Semiconductor-Metal Photodetectors," IEEE Journal of Quantum Electronics, vol. 28, No. 10, Oct. 1992, pp. 2358-2368.

Chou, S., et al., "Ultrafast and direct imprint of nanostructures in silicon," Nature, vol. 417, Jun. 20, 2002, pp. 835-837.

Chou, S., G.A., "Patterned Magnetic Nanostructures and Quantized Magnetic Disks," Proceedings of the IEEE, vol. 85, No. 4, Apr. 1997, pp. 652-671.

Cui, B.,et al., "Perpendicular quantized magnetic disks with 45 Gbits on a 4×2 $cm^2$ area," Journal of Applied Physics, vol. 85, No. 8, Apr. 15, 1999, pp. 5534-5536.

Deshpande, P., et al., "Lithographically induced self-assembly of microstructures with a liquid-filled gap between the mask and polymer surface," J. Vac. Sci. Technol. B 19(6), Nov.Dec. 2001, pp. 2741-2744.

Deshpande, P., et al., "Observation of dynamic behavior lithographically induced self-assembly of supromolecular periodic pillar arrays in a homopolymer film," Appl. Phys. Lett. 79 (11), Sep. 10, 2001, pp. 1688-1690.

Fan, S., et al., "Design of three-dimensional photonic crystals at submicron lengthscales" Appl. Phys. Lett. Sep. 1994 12;65(11)1466-1468.

Feiertag, G. , et al., "Fabrication of photonic crystals by deep x-ray lithography" Appl. Phys. Lett., Sep. 1997 15;71(11): 1441-1443.

Fink, Y., et al, "Guiding optical light in air using an all-dielectric structure" J. Lightwave Techn. Nov. 1999; 17(11):2039-2041.

Fink, Y., et al, "A dielectric omnidirectional reflector" Science, Nov. 1998 27;282:1679-1682.
Fischer, P.B., et al., "10 nm electron beam lithography and sub-50 nm overlay using a modified scanning electron microscope," Appl. Phys. Lett. 62 (23), Jun. 7, 1993, pp. 2989-2991.
Flanders, D.C., "Submicrometer periodicity gratings as artificial anisotropic dielectrics," Appl. Phys. Lett. 42 (6), 492-494 (1983).
Gabathuler, W., et al., "Electro-nanomechanically wavelength-tunable integrated-optical bragg reflectors Part II: Stable device operation" Optics Communications. Jan. 1998 1;145:258-264.
Gaylord, Thomas K. et al., "Analysis and applications of optical diffraction by gratings," Proc. IEEE. May 1985; 73(5):894-937.
Goeman, S., et al., "First demonstration of highly reflective and highly polarization selective diffraction gratings (GIRO-Gratings) for long-wavelength VCSEL's" IEEE Photon. Technol. Lett. Sep. 1998 10(9):1205-1207.
Hayakawa, Tomokazu, et al, "ARROW-B Type Polarization Splitter with Asymmetric Y-Branch Fabricated by a Self-Alignment Process," J. Lightwave Techn, 15(7),1165-1170, (1997).
Hereth, R., et al, "Broad-band optical directional couplers and polarization splitter," J. Lightwave Techn., 7(6), 925-930, (1989).
Ho, K.M., et al., "Existance of a photonic gap in periodic dielectric structures" Dec. 1990 17;65(25):3152-3155.
Ibanescu, M., et al., "An all-dielectric coaxial waveguide" Science. Jul. 2000 21;289:415-419.
Joannopoulos, J.D., et al., "Photonic crystals: putting a new twist on light" Nature. Mar. 1997 13(6621):143-149.
Kokubun, Y. , et al, "ARROW-Type Polarizer Utilizing Form Birefringence in Multilayer First Cladding," IEEE Photon. Techn. Lett., 11(9), 1418-1420, (1993).
Kuksenkov, D. V. , et al., "Polarization related properties of vertical-cavity surface-emitting lasers" IEEE J. of Selected Topics in Quantum Electronics. Apr. 1997; 3(2):390-395.
Levi, B.G. , "Visible progress made in three-dimensional photonic 'crystals'" Physics Today. Jan. 1999;52(1):17-19.
Li, M., et al., "Direct three-dimensional patterning using nanoimprint lithography," Appl. Phys. Lett. 78 (21), May 21, 2001, pp. 3322-3324.
Li, M., et al., "Fabrication of circular optical structures with a 20 nm minimum feature using nanoimprint lithography," Appl. Phys. Lett. 76 (6), Feb. 7, 2000, pp. 673-675.
Magel, G.A., "Integrated optic devices using micromachined metal membranes" SPIE. Jan. 1996;2686: 54-63.
Magnusson, R., et al., "New principle for optical filters" Appl. Phys. Lett. Aug. 1992 31;61(9):1022-1023.
Mashev, L., et al., "Zero order anomaly of dielectric coated gratings" Optics Communications. Oct. 15, 1985 55(6):377-380.
Moharam, M. G., et al., "Rigorous coupled-wave analysis of planar-grating diffraction" J. Opt. Soc. Am. Jul. 1981 71(7): 811-818.
Mukaihara, T., et al., "Engineered polarization control of GaAs/AlGaAs surface emitting lasers by anisotropic stress from elliptical etched substrate hole" IEEE Photon. Technol. Lett. Feb. 1993; 5(2):133-135.
Noda, S., et al., "New realization method for three-dimensional photonic crystal in optical wavelength region" Jpn. J. Appl. Phys. Jul. 1996 15;35:L909-L912.
Oh, M., et al., "Polymeric waveguide polarization splitter with a buried birefringent polymer" IEEE Photon. Techn. Lett. Sep. 1999; 11(9):1144-1146.
Painter, O. , et al., "Lithographic tuning of a two-dimensional photonic crystal laser array" IEEE Photon. Techn. Lett., Sep. 2000; 12(9):1126-1128.
Painter, O., et al., "Room temperature photonic crystal defect lasers at near-infrared wavelengths in InGaAsP" J. Lightwave Techn., Nov. 1999; 17(11):2082-2088.
Peng, S., et al., "Experimental demonstration of resonant anomalies in diffraction from two-dimensional gratings" Optics Lett. Apr. 1996; 15;21(8):549-551.
Ripin, D. J., et al., "One-dimensional photonic bandgap microcavities for strong optical confinement in GaAs and GaAs/AlxOy semiconductor waveguides" J. Lightwave Techn. Nov. 1999; 17(11):2152-2160.
Rokhinson, L.P., et al., "Double-dot charge transport in Si single-electron/hole transistors," Appl. Phys. Lett. 76 (12), Mar. 20, 2000, pp. 1591-1593.
Rokhinson, L.P., et al., "Kondo-like zero-bias anomaly in electronic transport through an ultrasmall Si quantum dot," Physical Review B, vol. 60, No. 24, Dec. 15, 1999, pp. 319-321.
Rokhinson, L.P., et al., "Magnetically Induced Reconstruction of the Ground State in a Few-Electron Si Quantum Dot," Physical Review Letters, vol. 87, No. 16, Oct. 15, 2001, pp. 1-3.
Rudin, A., et al., "Charge-ring model for the charge-induced confinement enhancement in stacked quantum-dot transistors," Appl. Phys. Lett. 73 (23), Dec. 7, 1998, pp. 3429-3431.
Russell, P. St. J., et al., "Full photonic bandgaps and spontaneous emission control in 1D multilayer dielectric structures" Opt. Commun. Feb. 1999 1;160:66-71.
Rytov, S. M., "Electromagnetic properties of a finely stratified medium" Soviet Physics JETP (Journal of Experimental & Theoretical Physics). May 1956; 2(1):466-475.
Schablitsky, S., et al., "Controlling polarization of vertical-cavity surface-emitting lasers using amorphous silicon subwavelength transmission gratings," Appl. Phys. Lett. 69 (1), Jul. 1, 1996, pp. 7-9.
Sharon, A. , et al., "Narrow spectral bandwidths with grating waveguide structures" Appl.Phys.Lett. Dec. 1996 30;69(27): 4154-4156.
Sugimoto, Y., et al., "Experimental verification of guided modes in 60 degrees—bent defect waveguides in AlGaAs-based air-bridge-type two-dimensional photonic crystal slabs" J. Appl. Phys. Mar. 2002 1;91(5):3477-3479.
Sun, X., et al., "Multilayer resist methods for nanoimprint lithography on nonflat surfaces" J. Vac. Sci. Technol. B. Nov./Dec. 1998 16(6)3922-3925.
Tibuleac, S., et al., "Reflection and transmission guided-mode resonance filters" J. Opt. Soc. Am. A. Jul. 1997; 14(7):1617-1626.
Trutschel, U. ,et al, "Polarization splitter based on anti-resonant reflecting optical waveguides," J Lightwave Techn., 13(2), 239-243, (1995).
Tyan, R.C., et al., "Design, fabrication and characterization of form-birefringent multilayer polarizing beam splitter" J. Opt. Soc. Am. A. Jul. 1997; 14(7):1627-1636.
Tyan, R. et al., "Polarizing beam splitters constructed of form-birefringent multilayer gratings," SPIE 2689, 82-89.
van Blaaderenm, Alfons, "Opals in a New Light" Science. Oct. 1998 30;282(5390):887-888.

van Doom, A. K. Jansen, et al., "Strain-induced birefringence in vertical-cavity semiconductor lasers" IEEE J. Quantum Electronics, Apr. 1998; 34(4):700-706.
Vellekoop, A.R. et al., "A small-size polarization splitter based on a planar phase optical phased array," J Lightwave Techn., 8(1), 118-124, (1990).
Wang, J., et al., "Molecular alignment in submicron patterned polymer matrix using nano-imprint lithography," Appl. Phys. Lett. 77 (2), Jul 10, 2000, pp. 166-168.
Wang, J., et al., "Fabrication of a new broadband waveguide polarizer with a double-layer 190 nm period metal-gratings using nanoimprint lithography" J. Vac. Sci. Technol. B, Nov./Dec.1999 17(6):2957-2960.
Wang, S. S., et al., "Design of waveguide-grating filters with symmetrical line shapes and low sidebands" Opt. Lett. Jun. 1994 15;19(12):919-921.
Wang, S. S., et al., "Guided-mode resonances in planar dielectric-layer diffraction gratings" J. Opt. Soc. Am. A. Aug. 1990 7(8):1470-1475.
Weber, M. F., Stover, C.A., Gilbert, L.R. , Nevitt, T.J. , Ouderkirk , A.J. "Giant birefringent optics in multilayer polymer mirrors," Science, 287, 2451-2456, Mar. 31, 2000.
Winn, J. N., et al., "Omnidirectional reflection from a one-dimensional photonic crystal" Opt. Lett. Oct. 1998 15;23(20):1573-1575.
Wu, L., et al., "Dynamic modeling and scaling of nanostructure formation in the lithographically induced self-assembly and self-construction" Appl. Phys. Lett. May 2003 12;82(19):3200-3202.
Yablonvitch, E., "Inhibited spontaneous emission in solid-state physics and electronics" Phys. Rev. Lett. May 1987 18;58(20):2059-2062.
Yablonovitch, E., et al., "Photonic band structure: The face-centered-cubic case employing nonspherical atoms" Phys. Rev. Lett. Oct. 1991 21;67(17):2295-2298.
Yanagawa, H. , et al, "High extinction guided-wave optical polarization splitter," IEEE Photon. Techn. Lett., 3(1), 17-18, (1991).
Yoshikawa, T., et al., "Polarization-controlled single-mode VCSEL" IEEE J. Quantum Electronics, Jun. 1998; 34(6): 1009-1015.
Yu, Z., et al., "Reflective polarizer based on a stacked double-layer subwavelength metal grating structure fabricated using nanoimprinted lithography," Appl. Phys. Lett. 77 (7), Aug. 14, 2000, pp. 927-929.
Zakhidov, A.A., et al., "Carbon structures with three-dimensional periodicity at optical wavelengths" Science. Oct 1998 30;282(5390):897-901.

* cited by examiner

FREESPACE TUNABLE OPTOELECTRONIC DEVICE AND METHOD

CROSS REFERENCE TO RELATED APPLICATIONS

This application claims the benefit of U.S. Provisional Application No. 60/417,226, filed Oct. 9, 2002, entitled "FREESPACE TUNABLE OPTOELECTRONIC DEVICE AND METHOD", with the named inventor Jian Wang.

FIELD OF THE INVENTION

The present invention relates generally to optoelectronic devices, and particularly to tunable optoelectronic devices.

BACKGROUND OF INVENTION

In general, the use of optoelectronic devices as well as the desirability of tunable optoelectronic devices are known to those possessing an ordinary skill in the pertinent arts. Possible applications for tunable optoelectronic devices include, by way of non-limiting example only, optical networking applications, telecommunications applications and other wavelength selective optical applications.

Tunable devices, such as filters, often represent important optical components for optical wavelength selective applications, in particular, in optical networking and fiber optic based communications. Many other networking modules/devices may be further realized using tunable filters as fundamental building blocks.

Examples of conventional tunable filters are: an Etalon, or fabry-Perot cavity, that may be tuned by adjusting the cavity length and/or optical index of the cavity; Fiber Bragg Grating (FBG) tunable filters, that may be tuned by mechanical adjusting the fiber length through strain or stress and/or by changing an effective optical index, such as by changing the polarization of a Liquid Crystal Display (LCD) or operating temperature; and acoustic-optic tunable filters (AOTFS) that may be tuned by utilizing surface acoustic-optic effects.

An Etalon may generally be used for tunable filtering if the effective optical cavity length can be changed. Either changing the physical length of the Etalon cavity or the optical index of the cavity material may be used. A major drawback of such a tunable filter lies in the inherent trade-off between wide tuning and narrow filter bandwidth. This is due to the free spectral range (FSR) of the Etaton (Fabry-Perot) structure. Further, two high reflectivity mirrors are typically desirably required in order to achieve a narrow (high Q) filter.

In order to tune an FBG filter, the optical index of the fiber or the grating period typically needs to be tunable. Both mechanical methods, such as the application of tensile or compressive forces to the filter to change the period, and thermal methods may be used to provide such tune-ability. However, a FBG tunable filter is typically undesirably slow to respond to driving input, while the tunable range is typically undesirably small.

AOTFs generally require acoustic-optical materials as a substrate, such as for example LiNbO3. Further, AOTFs are waveguide devices, not free-space devices, often are large in size due to the acoustic-optical interaction requirements, and require high power to operate.

As set forth, such filters may form optoelectronic devices themselves, or be used in other optoelectronic devices as components. One non-limiting example of such a device which may include such a filter is an external cavity tunable laser. Drawbacks with conventional approaches may include, for example, diffraction grating based devices needing mechanical rotation of the grating angle in order to perform tuning. Such rotation may be slow in nature and costly to build. Further, super-grating and sampled/chirped grating DBR tunable lasers may require special fabrication methods. Also, tuning through carrier injection in a DBR section may require special designs. Finally, with a fixed DFB/DBR laser design, current and temperature tuning range is conventionally small.

SUMMARY OF THE INVENTION

A tunable optoelectronic device comprising: a resonant grating filter exhibiting at least one filtering characteristic as electromagnetic radiation impinges thereupon; at least one dielectric material coupling said radiation onto said resonant grating filter and movably positioned with respect to said filter so as to adjust the at least one filtering characteristic of said filter; and, at least one driving circuit for selectively positioning said at least one dielectric material so as to tune said at least one filtering characteristic.

BRIEF DESCRIPTION OF THE FIGURES

Understanding of the present invention will be facilitated by consideration of the following detailed description of the preferred embodiments of the present invention taken in conjunction with the accompanying drawings, in which like references refer to like parts and in which.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in optical communications systems and optical energy sources. Those of ordinary skill in the art will recognize that other elements are desirable and/or required in order to implement the present invention. However, because such elements are well known in the art, and because they do not facilitate a better understanding of the present invention, a discussion of such elements is not provided herein. The disclosure herein is directed to all such variations and modifications to such systems and methods known to those skilled in the art.

According to an aspect of the present invention, a tunable filter may be realized utilizing a resonant grating filter and a dielectric material. By changing the distance between the top surface of the resonant grating filter and the dielectric material, the resonant grating filter may be tuned. According to an aspect of the present invention, a micro-electro-mechano-system (MEMS) may be used to selectively position the dielectric with respect to the resonant grating filter. A MEMS floating membrane may be realized on the top of the resonant grating filter. Electro-static force may be used to control the distance between the MEMS membrane and the resonant grating filter.

According to an aspect of the present invention, a resonant grating filter may be used to provide narrow-band filtering in a combined grating/waveguide structure. According to an aspect of the present invention, to make the resonant grating filter tunable, the effective index of the resonant grating waveguide structure may be adjusted. According to an aspect of the present invention, by moving the dielectric material closer to, or further away from an operable surface of the resonant grating structure, the effective index of the resonant grating structure may be effectively changed.

According to an aspect of the present invention, a nanostructure filter including a lower index (n1) bottom layer, high index layer (n2), lower index (n3) top layer may be effectively utilized. These three layers may form a waveguiding structure for radiation coupled through the dielectric material in a freespace application. A one- or two-dimensional grating may be inserted into the waveguiding structure. A dielectric material may be provided close to a top surface of the resonant grating filter so as to have a tunable distance, or gap, there between.

Figure 1:
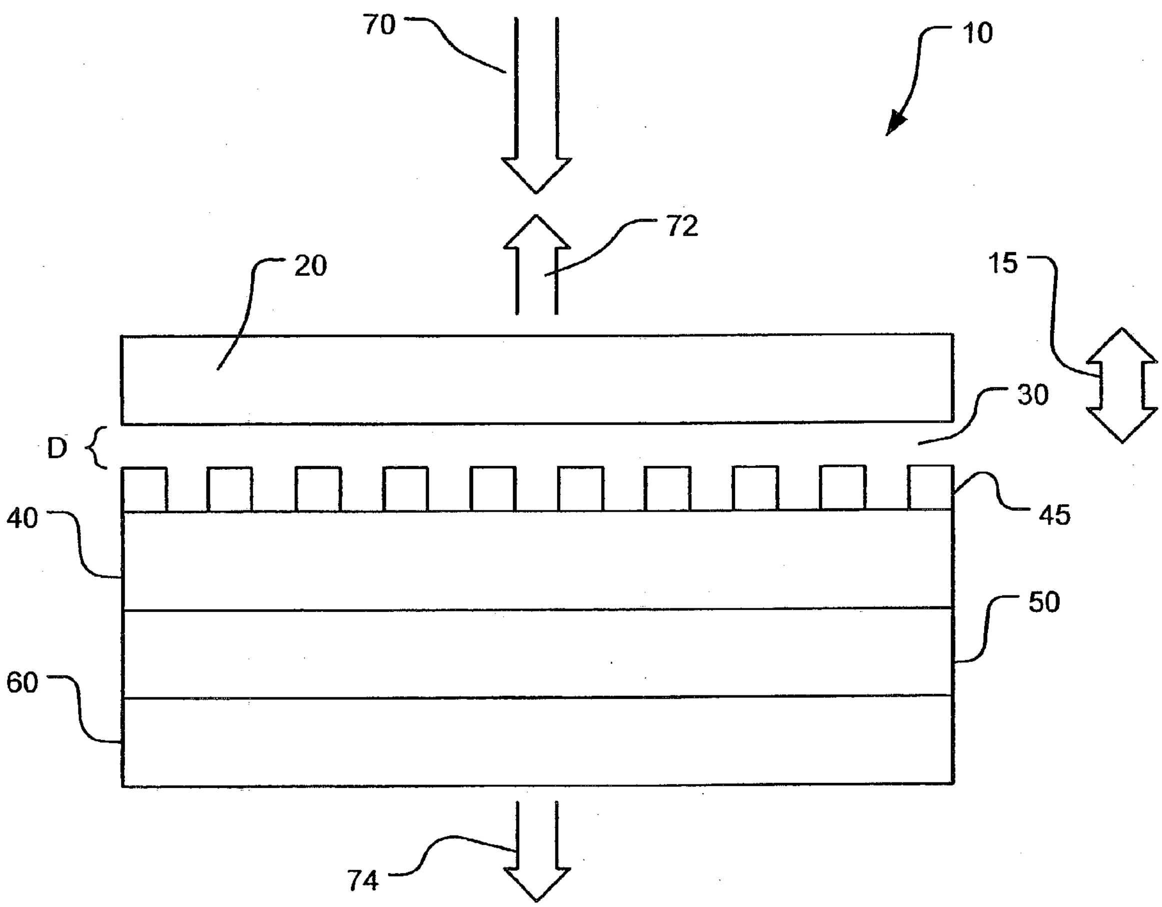
FIG. 1 illustrates a block-diagrammatic representation of a device according to an aspect of the present invention.

Referring now to FIG. 1, there is shown a block diagrammatic representation of an opto-electronic device 10 according to an aspect of the present invention. Device 10 generally includes membrane 20, upper cladding layer 30, waveguiding core layer 40, lower cladding layer 50 and substrate 60. A transmission 70 incident upon membrane 20 of device 10, may result in partial reflection 72 and transmission 74 thereof. This partial reflection/transmission defines a filtering characteristic of device 10 with regard to transmissions 70.

Referring still to FIG. 1, substrate 60 may take the form of glass or $SiO_2$, for example, and have a thickness of approximately 0.5 μm. Lower cladding layer 50 may take the form of a layer of $SiO_2$ having a thickness of approximately 1.5 μm, for example. Waveguiding core 40 may take the form of a layer of SiN having a thickness of approximately 0.4 μm, for example. Upper cladding layer 30 may take the form of a layer of SiO2 having a thickness of approximately 1 μm, for example. Finally, membrane 20 may take the form of an SiN film having a thickness of 0.4 μm.

According to an aspect of the present invention, a pattern of sub-wavelength optical elements, such as nanoelements or nanostructures 45, having a period, for example, on the order of 100 nm to 1000 nm in dimension, such as 900 nm for example, may be patterned onto, or into, core 40. As will be recognized by those possessing ordinary skill in the pertinent arts, various patterns may be used. These patterns may serve various optical or photonic functions. Such patterns may take the form of holes, strips, trenches or pillars, for example, all of which may have a common period (such as 0.9 μm) or not, and may be of various heights (such as 0.02 μm or 0.05 μm) and widths (such as 0.2 to 0.7 μm). The strips may be of the form of rectangular grooves, for example, or alternatively triangular or semicircular grooves. Similarly pillars, basically the inverse of holes, may be patterned. The pillars may be patterned with a common period in both axes or alternatively by varying the period in one or both axes. The pillars may be shaped in the form of, for example, elevated steps, rounded semi-circles, or triangles. The pillars may also be shaped with one conic in one axis and another conic in the other. Further, the patterns may take the form of variable or chirped structures, such as chirped gratings. Further, a multiple-period pixel structure, super-grating structure or multiple-peak filter or different filter pass band shape may be realized and utilized. Further, the pattern may form a multi-dimensional grating structure which may be polarization independent, for example.

According to an aspect of the present invention, membrane 20 may be provided as a film of SiN on a Micro Electro-Mechanical System (MEMS). The MEMS structure may include a base portion and deflectable portion being deflectable in the longitudinal direction 15 (FIG. 1) in a controlled fashion. The deflectable portion may have a membrane 20 (FIG. 1) deposited thereon and be on the order of about 50 to 200 μm in diameter, for example.

The MEMS device may be formed in any suitable manner. For example, by using a base filter including lower cladding 60, core layer 50 and upper cladding 40 with nanostructures 45 replicated into upper cladding 40 as discussed hereinabove, as a substrate to build the MEMS tunable membrane on. Forming the MEMS may include forming a lower electrode pattern, depositing at least one sacrificial layer, such as polyamide, for example, forming holes into the at least one sacrificial layer to provide membrane support depositing a membrane layer such as SiN, forming at least one window through the membrane layer to enable transmissions to pass there-through, depositing a top electrode contact, and removing the at least one sacrificial layer through the window, thereby suspending the membrane. Metal leads for applying an activating voltage across device 10 may be provided on membrane 20 and substrate 60, for example.

An air gap may be provided between membrane 20 and core 40. According to an aspect of the present invention, by varying the position of membrane 20 relative to waveguiding core 40, the effective refractive index of device 10 ($N_{eff}$) may be adjusted, thereby adjusting the filtering characteristics of device 10. The relative position of membrane 20 may be adjusted in the longitudinal direction designated 15 in FIG. 1. By adjusting a longitudinal distance D between membrane 20 and core 40, the effective refractive index of device 10 may be correspondingly altered. As the operating characteristics of device 10, such as wavelength selectivity for reflection 72 or transmission 74, are dependent upon the effective refractive index of the device 10, the operating characteristics of device 10 may be correspondingly altered.

Figure 2:
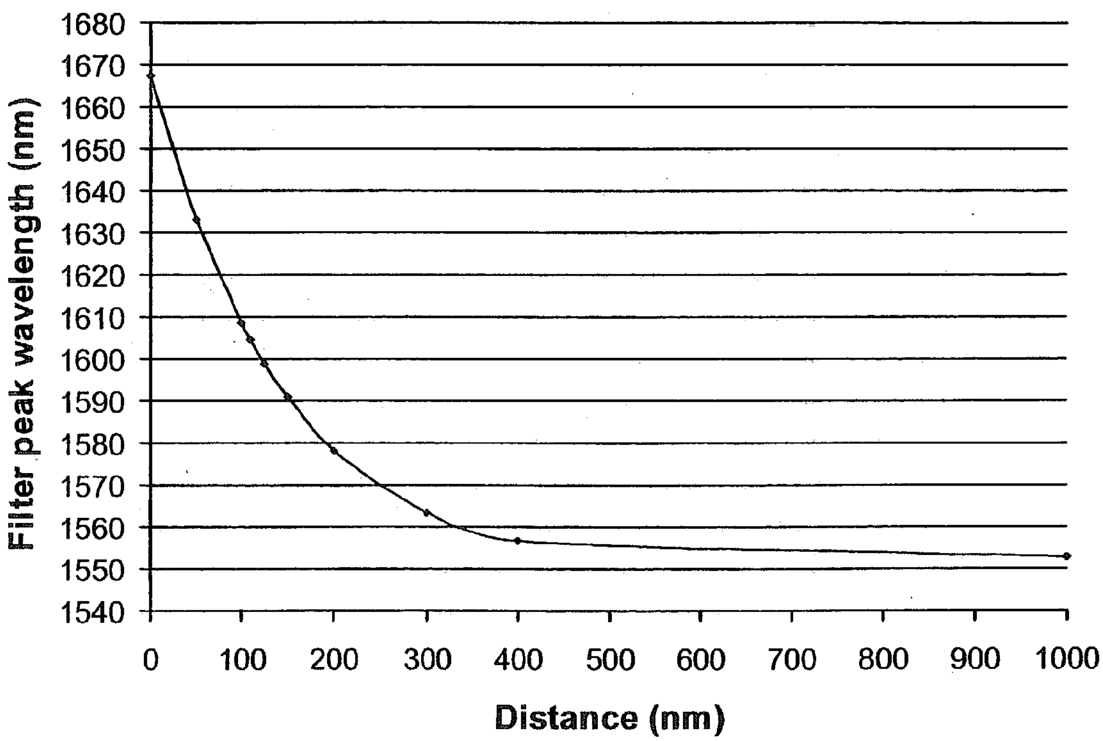
FIG. 2 illustrates a graphical representation of performance characteristic associated with the device of FIG. 1.
Figure 3A:
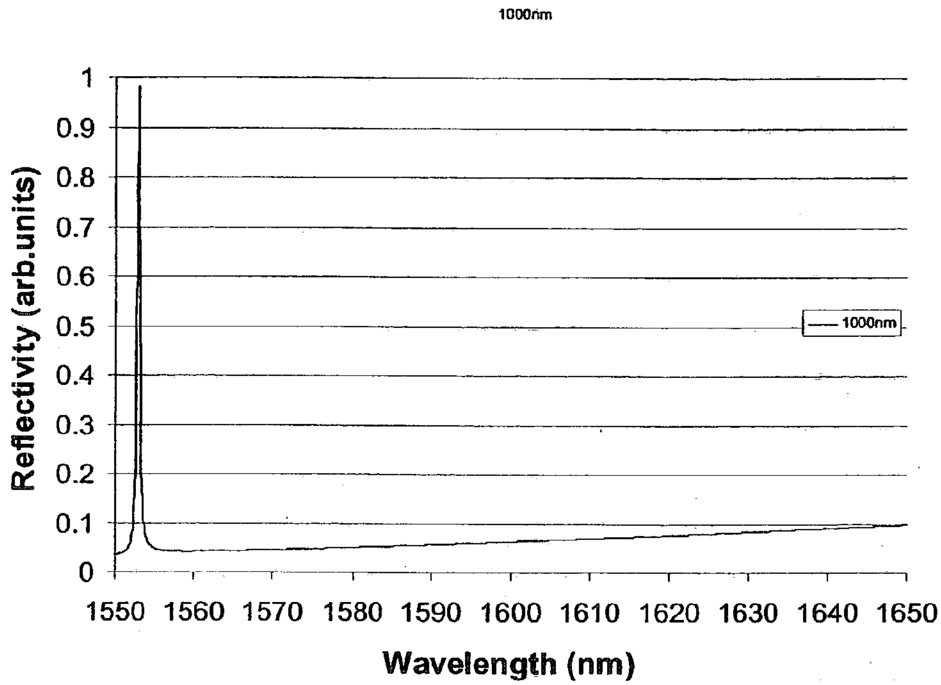
FIGS. 3A–3I illustrate a graphical representation of some exemplary tunable ranges of a filter according to an aspect of the present invention.
Figure 3B:
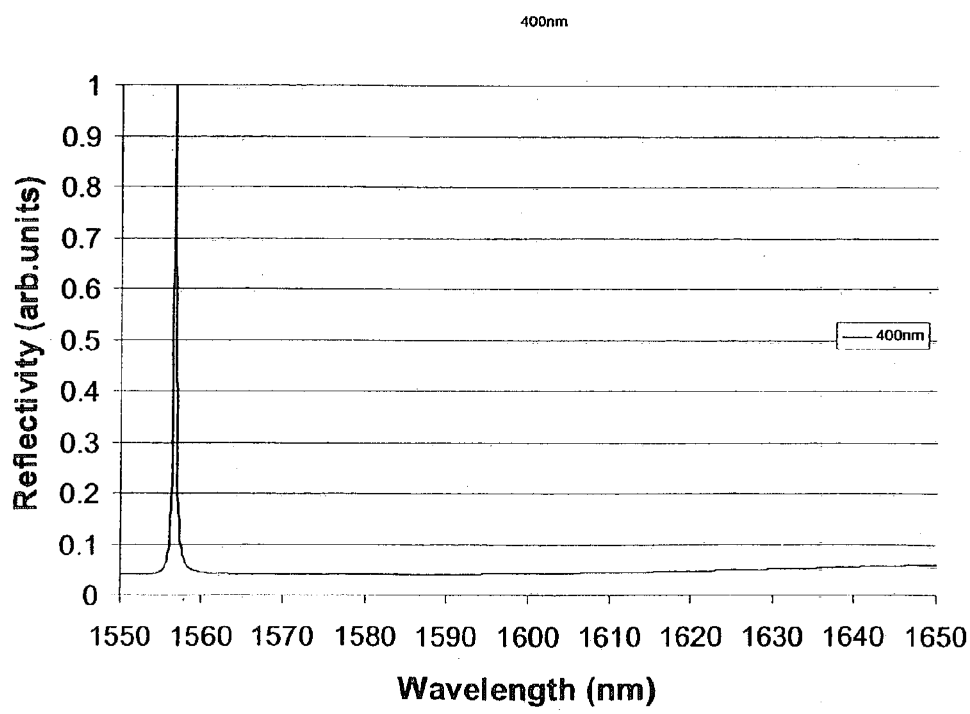
Figure 3C:
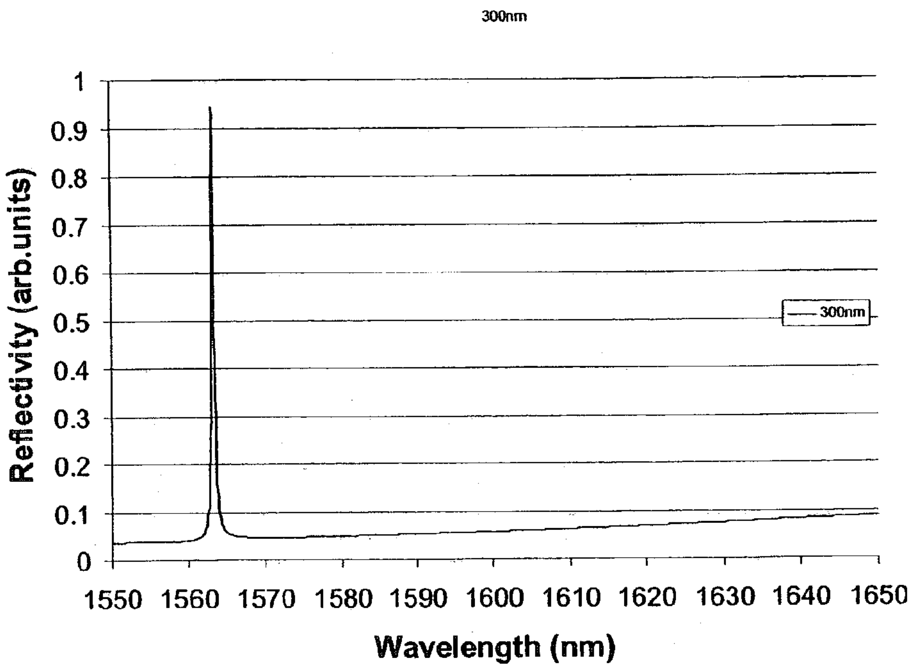
Figure 3D:
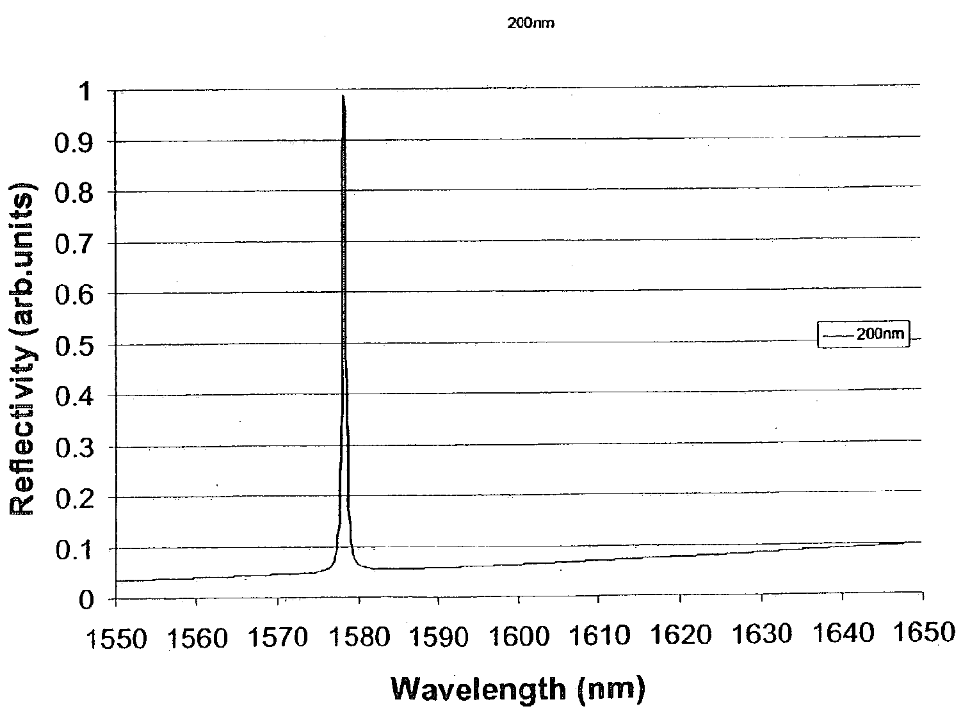
Figure 3E:
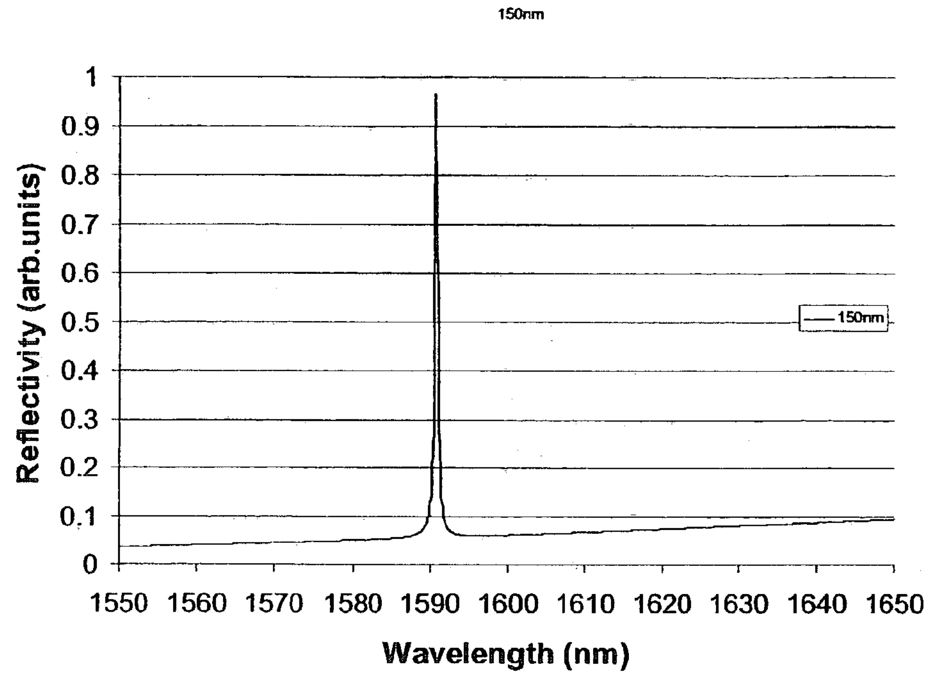
Figure 3F:
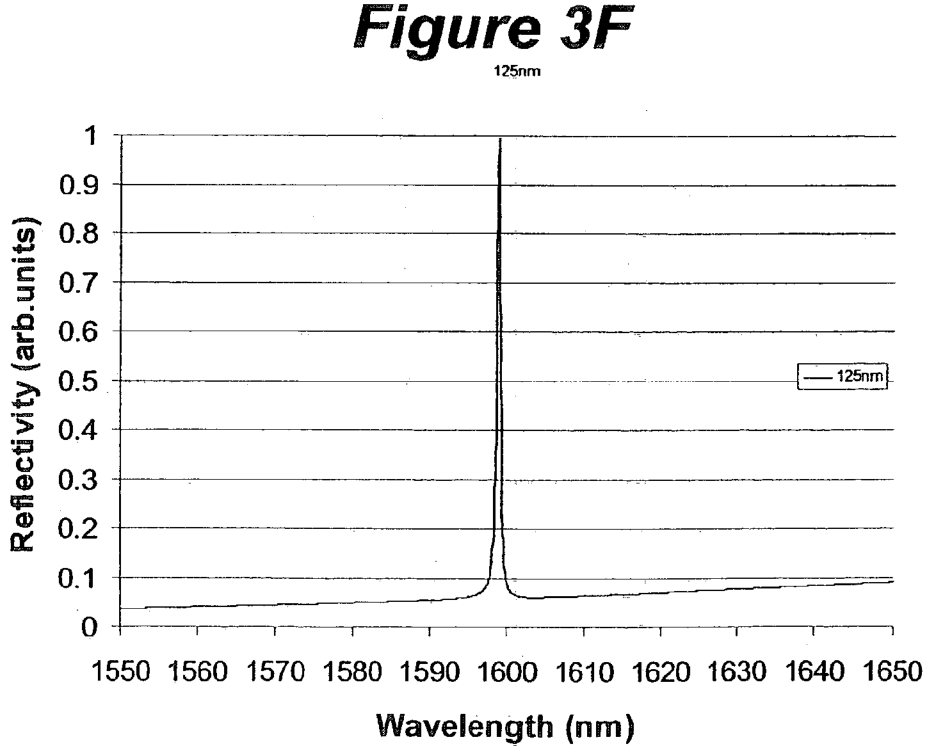
Figure 3G:
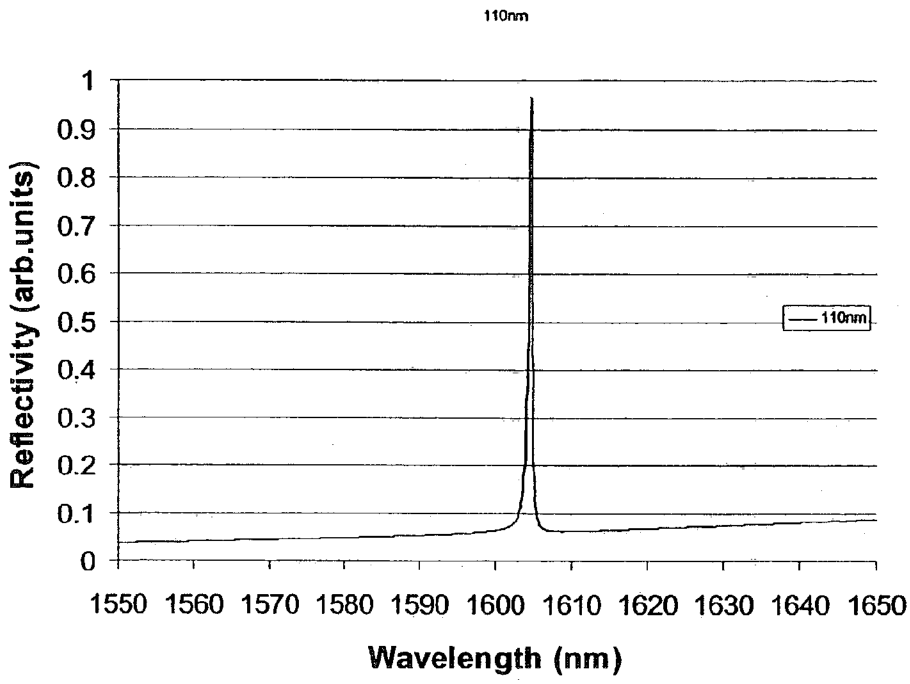
Figure 3H:
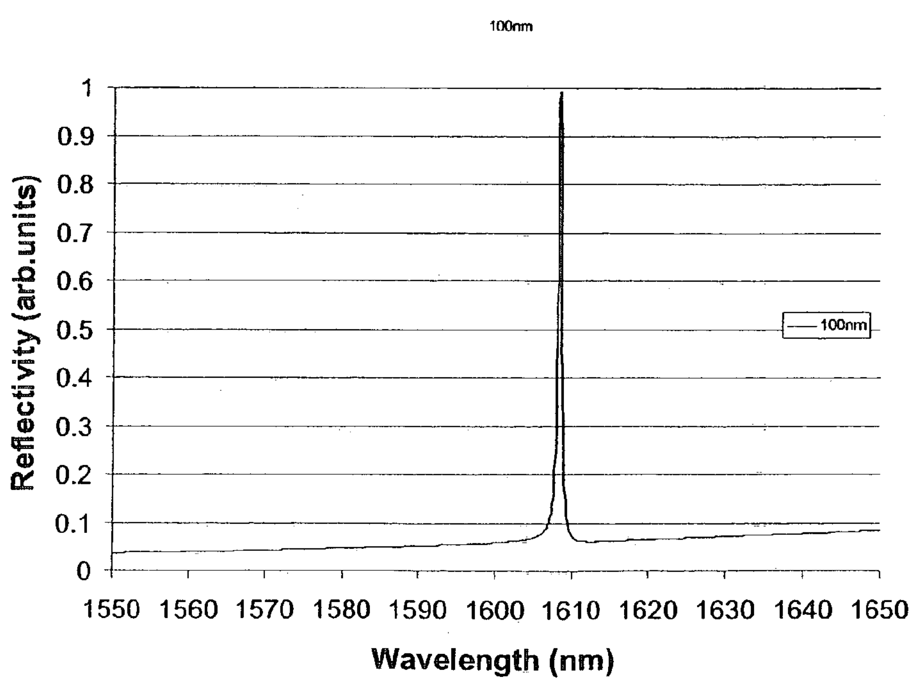
Figure 3I:
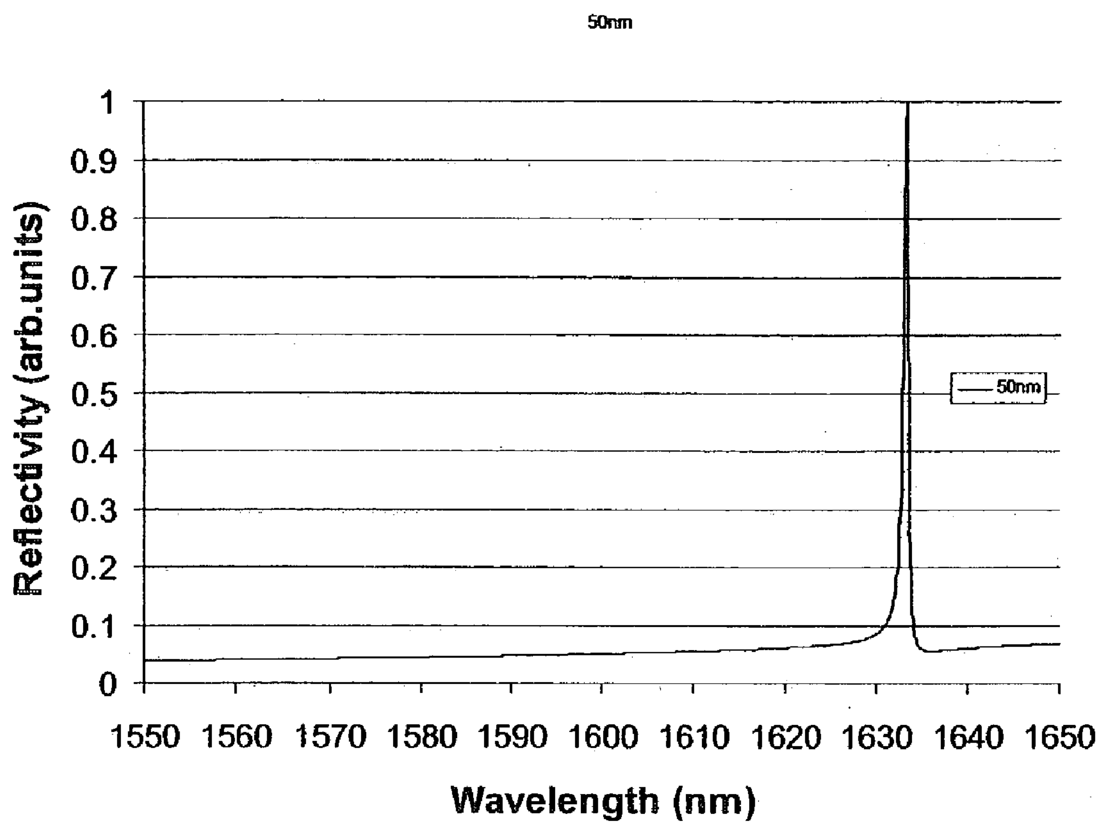

Referring now also to FIG. 2, there is shown a graphical representation of the performance characteristic of peak filtering wavelength as a function of distance D associated with the device 10 of FIG. 1. As will be evident to one possessing an ordinary skill in the pertinent arts, as distance D is altered, so is the peak filtering wavelength of device 10. For example, where D≈100 nm, the peak filtering wavelength ($\lambda_{peak}$) of device 10 is approximately 1608 nm. And, where D≈1000 nm, the peak filtering wavelength ($\lambda_{peak}$) of device 10 is approximately 1553 nm.

Referring now also to FIGS. 3A–3I, inclusive, there are shown the operating characteristic of reflectivity of device 10 (72 of FIG. 1) as a function of peak filtering wavelength $\lambda_{peak}$ thereof. As will be evident to those possessing an ordinary skill in the pertinent arts, by controlling the peak filtering wavelength $\lambda_{peak}$ of device 10, the reflectivity thereof may be correspondingly controlled. Hence, as will be ultimately evident to one possessing an ordinary skill in the pertinent arts, by altering distance D associated with device 10, tuning of the optical characteristic of reflectivity of device 10 may be advantageously achieved— resulting in a wavelength tunable filter. Such a filter may be utilized in many applications, such as with other photonic components being suitable for telecommunications applications for example.

More particularly, the resonant wavelength of device 10 for purposes of reflectivity and transitivity ($\lambda_{res}$) may be characterized by equation EQ1.

$$\lambda_{res} \cong n_{eff} \Lambda \quad \text{(EQ1)}$$

where, $$n_{eff} \propto f(n_{core}, n_{upper\_clad}, n_{lower\_clad}) \quad \text{(EQ2)}$$

and $\Lambda$ defines the periodicity of the nanostructures of the core.

By adding a dielectric material in the form of membrane 20 relatively close to pattern 45 of core 40, and by controlling and tuning the distance D between the pattern 45 and the membrane 20, a tunable resonant grating filter may be achieved. As set forth, membrane 20 may be positioned using a MEMS design, which essentially allows a membrane to float over the surface of the resonant grating filter and the gap defining distance D to be tuned by selectively activating the MEMS device. The MEMS device may be selectively activated by applying a voltage thereto which electrostatically attracts or pushes membrane 20 to or away from pattern 45.

A realizable advantage of such a tunable resonant grating filter based device 10 is, for example, a relatively large tunable range. Such a device may be readily tuned over greater than a 100 nm range centered around a center frequency, so as to provide a 1.3 or 1.5 micron telecommunication wavelength window, for example. FIGS. 3A–3I demonstrate one embodiment substantially centered around the 1.5 micron band, for example. By using a higher index dielectric membrane material, such as Silicon, an even larger tuning range may be achieved. Utilizing a MEMS device, the bandwidth of the filter may be tailored to particular design requirements. Further, by selecting an appropriate pattern, such a tunable filter can be polarization sensitive or insensitive depending on one-dimensional or two-dimensional grating structures used, for example.

Figure 4:
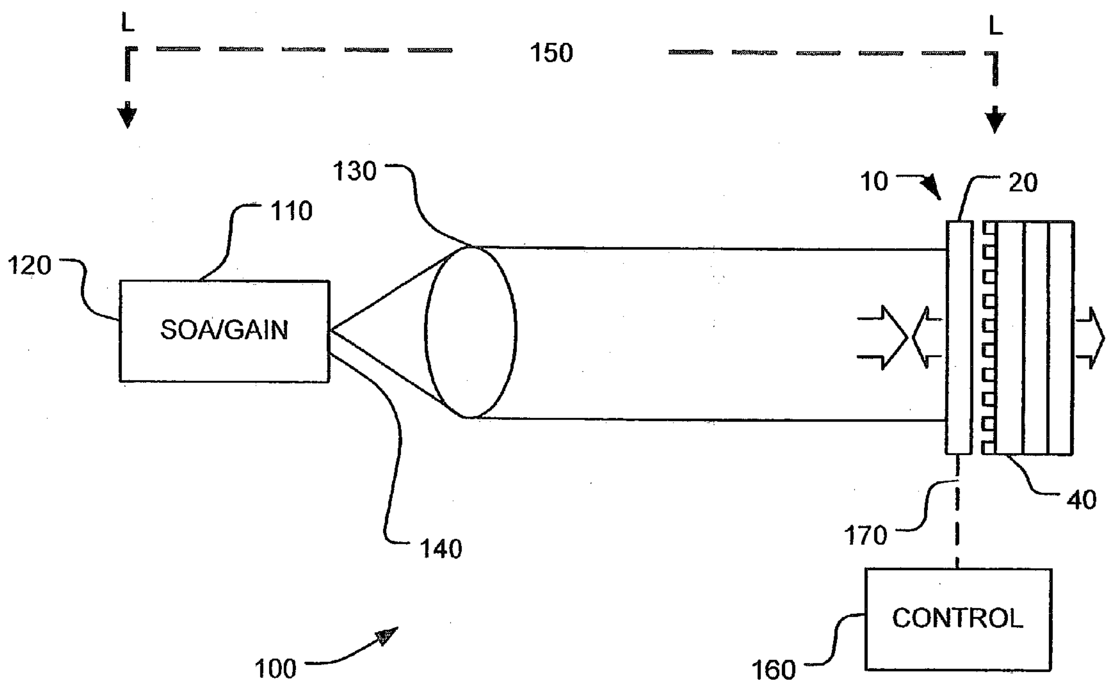
FIG. 4 illustrates a block-diagrammatic representation of a laser according to an aspect of the present invention.

Referring now to FIG. 4, there is shown a block-diagrammatic representation of an external cavity laser 100 according to an aspect of the present invention. Laser 100 generally includes Semiconductor Optical Amplifier (SOA) or gain region device 110, lens 130 and wavelength tunable filter 10.

SOA device 110 may take the form of any suitable Light Amplification by Stimulated Emission of Radiation (LASER) device, such as a type III–V semiconductor based laser. Such a device may emit and amplify electromagnetic radiation over a given spectral range, such as 1400–1620 nm. SOA device 110 may include a high reflectivity rear facet 120 and front facet 140 having an anti-reflective (AR) coating reducing reflections on the order of $10^{-4}$ as is well understood by those possessing an ordinary skill in the pertinent arts. SOA device 110 may take the form of a Distributed Bragg Reflector (DBR) laser as is conventionally understood, for example.

SOA device 110 may be optically coupled to lens 130 via facet 140. Lens 130 may take the form of an aspheric lens suitable for applying transmissions from facet 140 to an operable surface area of filter 10 and transmissions from device 10 to device 110. That is, lens 130 may take the form of coupling and/or collimating optical elements and lenses.

In operation, device 120 may emit electromagnetic radiation, such as infrared light coherent light transmissions, in the given spectral range. These transmissions may be incident upon membrane 20 of device 10 either directly, or after reflection from facet 120, for example. By selectively positioning membrane 20 with respect to waveguiding core 40 as has been set forth, the reflectivity of device 10 may be correspondingly tuned.

Facet 120 and device 10 may form a resonating cavity 150 having a length L—L greater than about 1 cm, for example. Cavity 150 may resonate electromagnetic waves having a wavelength corresponding to the resonant wavelength ($\lambda_{res}$) of device 10, thus forming an external cavity laser as will be readily understood by those possessing an ordinary skill in the pertinent arts.

According to an aspect of the present invention, device 100 may be realized using a MEMS design, as has been set forth. That is, a MEMS membrane floating on the top of the resonant grating filter may be provided. Device 100 may include a controller 160 for selectively positioning membrane 20, by applying a voltage using electrical contacts 170 with the dielectric material membrane 20 and resonant grating filter waveguiding core 40, for example. In response thereto, an electrostatic force may selectively position membrane 20 closer or further away from waveguiding core 40.

Such a tunable laser may be polarization dependent/sensitive or polarization independent/insensitive depending on if one-dimensional or two-dimensional gratings are used, for example. Thus, providing a polarization dependent/sensitive or polarization independent/insensitive device 100.

Figure 5A:
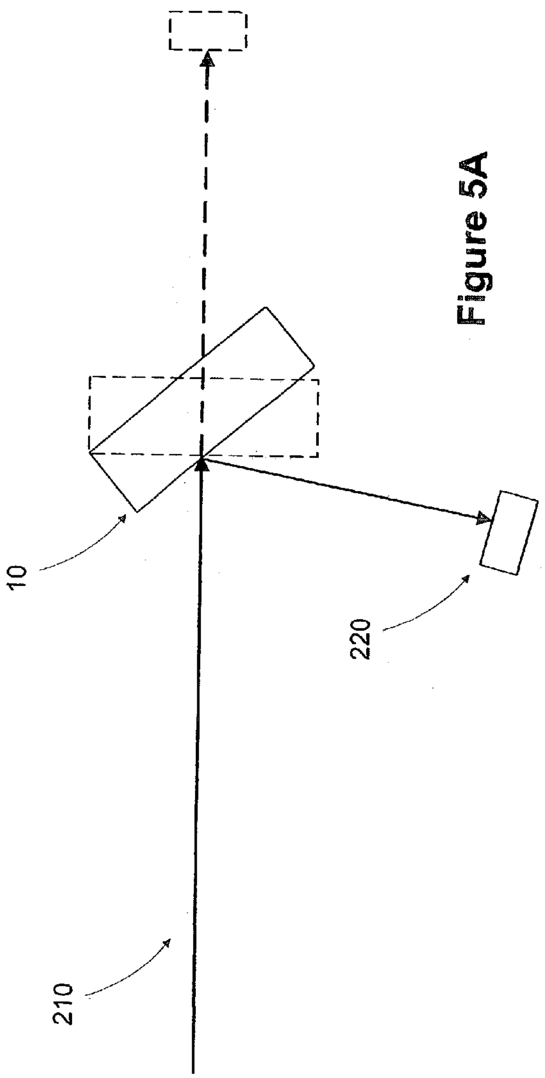
FIG. 5A illustrates a block-diagrammatic representation of an optical performance monitor including the device of FIG. 1.
Figure 5B:
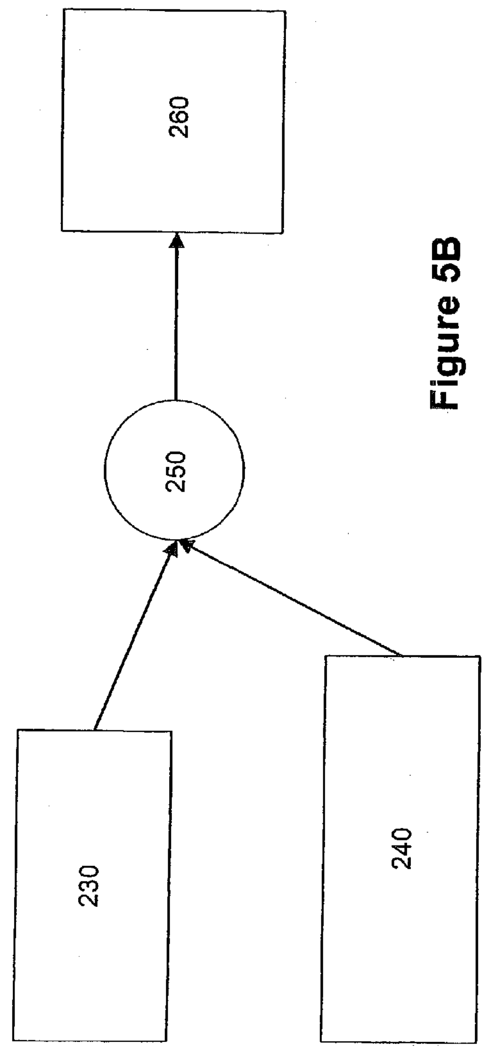
FIG. 5B illustrates a block-diagrammatic representation of the mathematical manipulation included in the optical performance monitor of FIG. 5A; and, FIG. 6 illustrates a block-diagrammatic representation of the add/drop module including the device of FIG. 1.

Referring now to FIGS. 5A and 5B, there is shown a free-spaced optical performance monitor 200 utilizing device 10. Free-spaced optical performance monitor includes an incoming transmission 210, device 10, and a detector 220 as is shown in FIG. 5A. As shown in FIG. 5B, the free-space optical performance monitor 200 further includes an as measured spectrum 230 at detector 220, known characteristics 240 of device 10, such as for example spectral shape, of the filtering characteristic of device 10 deconvolved 250 thereby producing real spectrum 260.

Detector 220 may be of the form of a charge-coupled-detector, such as a short-wave infrared charge-coupled detector, a photomultiplier tube, or other detector known to those possessing an ordinary skill in the pertinent arts. Detector 220 need only be suited to receive and respond to the wavelength selected by device 10 and respond to the selected wavelength with a response time faster than the wavelength tuning rate.

Free-space optical performance monitor 200 may be designed to operate in reflection a shown in FIG. 5A (solid lines) or in transmission shown FIG. 5A (dashed lines). In either mode a configuration, incoming transmission 210 may be a signal which is desirable to monitor, such as a DWDM signal. Transmission 210 is incident upon device 10. Device 10, operating for example in reflection mode, may be scanned in wavelength by actuating the membrane, described hereinabove, selectively controlling the reflection band. Similarly, if the performance monitoring operates in transmission, the scanning of wavelength by actuating the membrane would selectively control the pass-band of device 10. In unison with this scanning, either in reflection or transmission, detector 220 is monitored providing a signal corresponding to the light in the selected wavelength, thereby providing measured spectrum 230. Measured spectrum 230 may be manipulated 250 with known characteristics 240 of device 10 such as by using convolutional and deconvolutional techniques as would be known to those possessing an ordinary skill in the pertinent arts, the result of which provides real spectrum 260 of incoming transmission 210.

Figure 6:
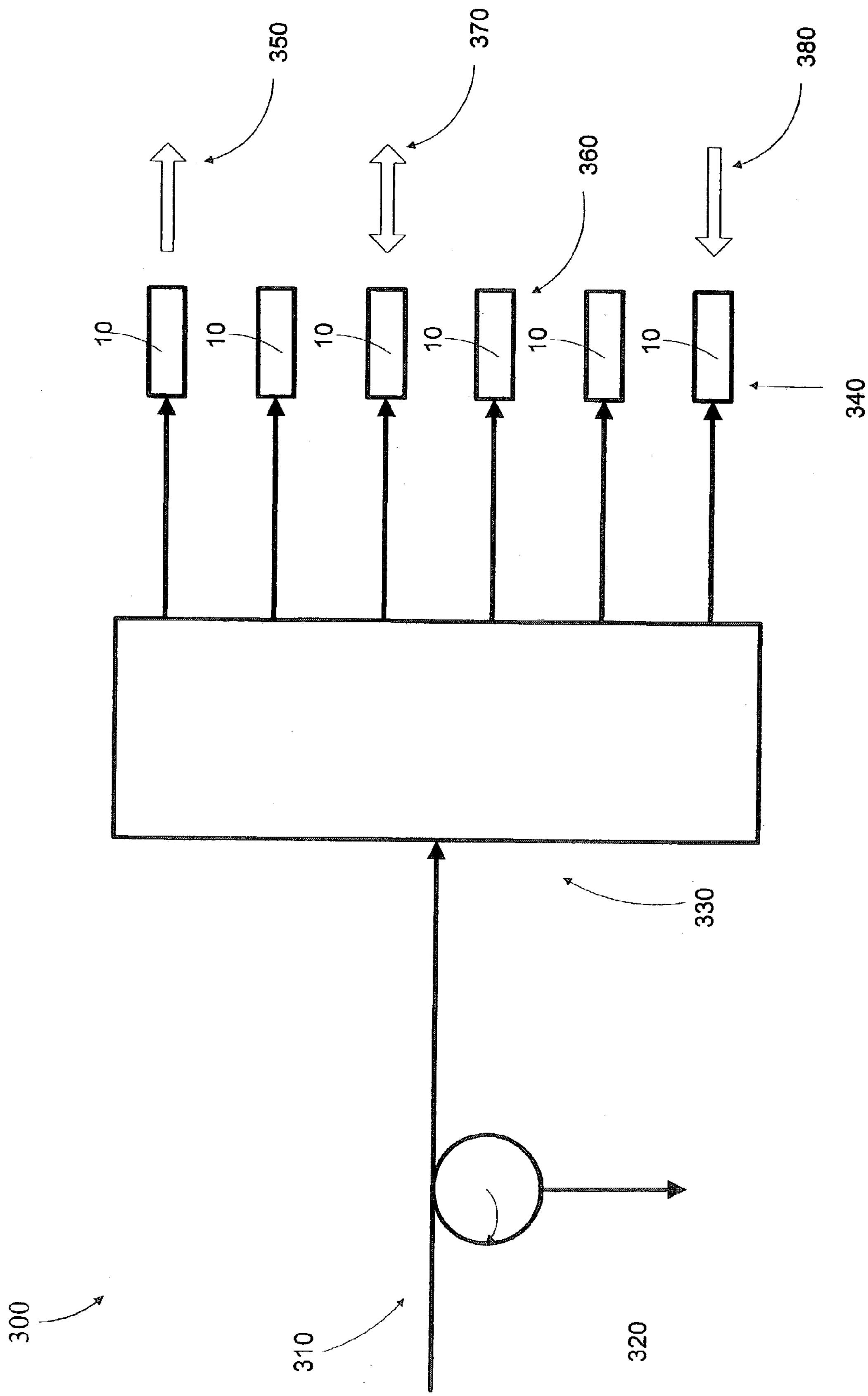

Referring now to FIG. 6, there is shown a free-spaced tunable add/drop module 300 utilizing device 10. Free-spaced tunable add/drop module 300 includes an incoming transmission 310, a circulator 320 for input and output coupling, a demultiplexer 330 and an array or plurality 340 of devices 10.

Circulator 320 may have a number of ports identified in a specific sequence. As is known to those possessing an ordinary skill in the pertinent arts, circulator 320 may operate by substantially outputting energy input through one port through the next port in the sequence. For example, radiation of a certain wavelength may enter circulator 320 through a port x and exit through a port x+1, while radiation of another wavelength may enter through a port x+2 and exits through a port x+3. For example, a circulator disclosed in U.S. Pat. No. 4,650,289, entitled OPTICAL CIRCULATOR, the entire disclosure of which is hereby incorporated by reference as if being set forth in its entirety herein may be used. Circulator 320 may also take the form of a beamsplitter, as is known to those possessing an ordinary skill in the pertinent arts.

Demultiplexer 330 may be used to separate incoming input signal 310 into constituent parts for use in add/drop module 300. Multi-channel-input signal 310 may be demultiplexed, separated spatially into different branches based on wavelength, for example. For example, if the incoming signal has a wavelength range λ, demultiplexer 330 may separate a received signal into a plurality, such as 6 equally sized branches, as may be seen in FIG. 6. Each branch may include a signal of wavelength range λ/6. Demultiplexer 330 may take the form of a diffractive grating, prism or grism, for example. Such a grating prism, or grism combines and splits optical signals of different wavelengths utilizing a number of output angles offering high wavelength resolution and attaining narrow wavelength channel spacing. After being demultiplexed, each channel propagating a portion of the overall wavelength range may be aligned with one tunable device 10 in an array 340 of tunable devices 10.

Array 340 of tunable devices 10 may include individual tunable devices 10 as shown in FIG. 1 and discussed hereinabove. Each tunable device 10 may operate as a tunable narrow-band reflective mirror and a tunable notch filter. When energy propagation reaches device 10, by controlling mechanically controllable membrane 20 aligned in one of the tunable device 10, such as a MEMs or other suitable device, each may be configured according to whether the channel is desired to be added or dropped. For example, if a channel desiring to be dropped 350 is received at a filter 10, that filter 10 may be configured so as to pass this channel's signal, as a notch filter, for example. On the other hand, if the channel contains a signal desired to continue to propagate 360, i.e. not to be dropped, the filter will be configured so as to reflect this channel's signal, a narrow-band reflective mirror. Additionally, if a signal is desired to be added corresponding in wavelength with a signal to be dropped 370, or a previously substantially unused wavelength 380, this signal may be added by passing through the corresponding filter used to drop a portion of the signal. For either adding a previously unused wavelength or for adding a previously dropped wavelength, filter 10 may be configured so as to pass this signal to be added, as a notch filter, for example. In the case of adding a signal corresponding in wavelength to a signal to be dropped, filter 10 would already be configured to pass the wavelength in order to effectuate the signal drop discussed hereinabove. When the signal reaches filter 10, since filter 10 may be configured as a notch filter suitable to pass the signal, the signal may be transmitted through filter 10, thereby entering the system and passing through to demultiplexer 330.

Wavelengths reflected or added at array 340 of tunable devices 10 propagate through demultiplexer 330. Demultiplexer 330 operates to combine this returning energy back into a single energy propagation. This combined energy propagation propagates through to circulator 320 and is outputted as a transmission.

Further, if device 10 operates as a variable optical attenuator or variable optical reflector, then the above free-spaced tunable add/drop module 300 may be utilized as a dynamic gain equalization filter. Dynamic gain equalization may be necessary due to effects resulting from increasing bandwidth causing channel powers to become unbalanced. Non-uniformity of channel powers arises from non-linear effects such as Raman scattering in a communicative fiber and the cumulative effects of cascaded optical amplifiers. Further, in large systems, these effects may be pronounced. If the channel power imbalance is not mitigated, overall system performance may be degraded and service reliability may be reduced. Dynamic equalization eliminates gain tilt, gain shape changes, and accumulated spectral ripple that occurs due to dynamic changes in optical networks. It permits longer distance, higher bandwidth and light-path flexibility in optical transmission links with less frequent O-E-O regeneration.

Operatively, for example, the above free-spaced tunable add/drop module 300 may be configured, instead of substantially transmitting or reflecting the incoming signal as described hereinabove, to partially transmit and reflect the signal. By so doing, device 10 may gain equalize the overall signal substantially equating the signal in each band.

As would be known to those possessing an ordinary skill in the pertinent arts, device 10 may have a defined pass-band and an edge of the pass-band. In order to gain equalize, device 10 may be set to pass a wavelength slightly offset from the wavelength propagating as described in the add/drop discussion, thereby utilizing the edge of the band as a partially transmitting/reflecting filter. Slight tuning of the offsets may be utilized to modify the amount of reflected signal, thereby being suitable for use in equalizing the signal reflected from device 10 in each pass band. The amount of offset for a given pass band may be modified according to the incoming signal characteristics, varying the reflectance in a pass band as described herein, thereby adding a dynamic feature to the gain equalization.

It will be apparent to those skilled in the art that various modifications and variations may be made in the apparatus and process of the present invention without departing from the spirit or scope of the invention. Thus, it is intended that the present invention cover the modification and variations of this invention provided they come within the scope of the appended claims and their equivalents.

What is claimed is:

1. A tunable optoelectronic device being suitable for freespace operation comprising:

a resonant grating filter exhibiting at least one filtering characteristic as electromagnetic radiation impinges thereupon; and at least one dielectric material coupling said radiation onto said resonant grating filter and movably positioned with respect to said filter so as to adjust the at least one filtering characteristic of said filter, wherein said impinging electromagnetic radiation passes through said dielectric material prior to impinging upon said filter.

2. A tunable optoelectronic device being suitable for freespace operation comprising:

a resonant grating filter exhibiting at least one filtering characteristic as electromagnetic radiation impinges thereupon; and at least one dielectric material coupling said radiation onto said resonant grating filter and movably positioned with respect to said filter so as to adjust the at least one filtering characteristic of said filter, wherein said filter comprises an upper cladding layer, a core and a lower cladding layer.

3. The device of claim 2, wherein said upper and lower cladding layers comprise SiO2 and said core comprises SiN.

4. The device of claim 3, wherein said upper cladding layer has a thickness of approximately 0.1 micron, said core has a thickness of approximately 0.4 microns and said lower cladding layer has a thickness of approximately 1.5 microns.

5. The device of claim 3, wherein said dielectric material comprises SiN.

6. The device of claim 5, wherein said upper cladding layer has a thickness of approximately 1 micron, said core has a thickness of approximately 0.4 microns, said lower cladding layer has a thickness of approximately 1.5 microns and said dielectric material has a thickness of approximately 0.4 microns.

7. A tunable optoelectronic device being suitable for freespace operation comprising:

a resonant grating filter exhibiting at least one filtering characteristic as electromagnetic radiation impinges thereupon;

at least one dielectric material coupling said radiation onto said resonant grating filter and movably positioned with respect to said filter so as to adjust the at least one filtering characteristic of said filter; and a semiconductor optical amplifier, wherein said dielectric material is optically interposed between said filter and amplifier in freespace.

8. The device of claim 7, wherein said amplifier and filter define a cavity of an external cavity laser.

9. The device of claim 8, further comprising at least one controller operatively coupled to at least said filter or dielectric material so as to adjust an operating wavelength of said external cavity laser by adjusting a distance between said dielectric material and filter.

10. The device of claim 7, further comprising collimating optics optically interposed between said amplifier and filter.

11. The device of claim 7, wherein said amplifier is a laser.

12. The device of claim 11, wherein said laser is a type III–V semiconductor optical amplifier.

13. The device of claim 11, wherein said laser is a Distributed Bragg Reflector laser.

* * * * *